United States Patent
Pibre et al.

(10) Patent No.: US 12,129,394 B2
(45) Date of Patent: Oct. 29, 2024

(54) METHOD FOR THE PREVENTION OF MIST FORMATION IN A DEVICE COMPRISING ROLLS DURING THE COATING OF FLEXIBLE SUPPORTS WITH A CROSS-LINKABLE LIQUID SILICONE COMPOSITION

(71) Applicant: Elkem Silicones France SAS, Lyons (FR)

(72) Inventors: Guillaume Pibre, Lezoux (FR); Stéphanie Benitou, Saint Cyr sur le Rhône (FR); Emmanuel Pouget, Lyons (FR)

(73) Assignee: Elkem Silicones France SAS, Lyons (FR)

( * ) Notice: Subject to any disclaimer, the term of this patent is extended or adjusted under 35 U.S.C. 154(b) by 686 days.

(21) Appl. No.: 17/416,051

(22) PCT Filed: Dec. 19, 2019

(86) PCT No.: PCT/EP2019/086436
§ 371 (c)(1),
(2) Date: Jun. 18, 2021

(87) PCT Pub. No.: WO2020/127818
PCT Pub. Date: Jun. 25, 2020

(65) Prior Publication Data
US 2022/0049122 A1 Feb. 17, 2022

(30) Foreign Application Priority Data
Dec. 20, 2018 (EP) .................... 18306764

(51) Int. Cl.
*C09D 7/40* (2018.01)
*B05D 1/28* (2006.01)
*C09D 183/06* (2006.01)

(52) U.S. Cl.
CPC ............ *C09D 183/06* (2013.01); *B05D 1/28* (2013.01); *C09D 7/40* (2018.01)

(58) Field of Classification Search
CPC .......... C09D 183/06; C09D 7/40; B05D 1/28; C08L 83/07; C08L 83/00; C08G 77/20; C08G 77/26
USPC .......................................... 524/560
See application file for complete search history.

(56) References Cited

U.S. PATENT DOCUMENTS

| | | | |
|---|---|---|---|
| 4,806,391 A | 2/1989 | Shorin | |
| 6,057,033 A | 5/2000 | Bilodeau | |
| 8,344,089 B2 | 1/2013 | Frey et al. | |
| 11,078,379 B2* | 8/2021 | Pibre | C09D 183/08 |
| 2019/0249036 A1* | 8/2019 | Pibre | C09D 183/08 |

FOREIGN PATENT DOCUMENTS

| | | |
|---|---|---|
| EP | 0716115 A2 | 6/1996 |
| FR | 2894590 A1 | 6/2007 |
| WO | 2004046248 A1 | 6/2004 |
| WO | 2017220871 A1 | 6/2017 |

OTHER PUBLICATIONS

International Search Report of International Patent Application PCT/EP2019/086436 dated Jan. 30, 2020.

* cited by examiner

*Primary Examiner* — Hannah J Pak
(74) *Attorney, Agent, or Firm* — McBee Moore & Vanik, IP, LLC

(57) ABSTRACT

The invention relates to the general field of coating various flexible supports, such as sheets of paper or synthetic polymer (polyolefin, polyester, etc) sheets or fabric sheets, with a silicone on high-speed rolls. The invention relates to an efficient method for preventing mist formation when coating flexible supports with a liquid silicone composition precursor of cross-linked coatings, said coating process being performed using a coating device that includes a roll operating at a high speed.

11 Claims, No Drawings

METHOD FOR THE PREVENTION OF MIST FORMATION IN A DEVICE COMPRISING ROLLS DURING THE COATING OF FLEXIBLE SUPPORTS WITH A CROSS-LINKABLE LIQUID SILICONE COMPOSITION

CROSS-REFERENCE TO RELATED APPLICATIONS

This application is the National Stage entry of International Application No. PCT/EP2019/086436, filed 19 Dec. 2019, which claims priority to European Patent Application No. 18306764.4, filed 20 Dec. 2018.

BACKGROUND

Field

The invention relates to the general field of the silicone coating on high-speed rolls of various flexible supports, such as sheets of paper or of synthetic polymer (polyolefin, polyester, etc.), or else of textile.

More precisely, the invention relates to the coating of flexible materials with liquid compositions containing one or more organopolysiloxanes which are crosslinkable by polyaddition, by dehydrogenative condensation, by polycondensation, by the cationic route or by the radical route, so as to form a protective coating or film having in particular release and/or hydrophobic properties.

The flexible supports may be papers, cardboards, plastic films, metallic films or textiles. Examples of applications for these silicone-coated supports include: paper for foodstuffs (cooking, packaging), labels and adhesive tape, conveyor belts, etc.

Description of Related Art

The coating of these flexible supports with crosslinkable liquid silicones is performed on coating devices operating continuously and at very high speed. These devices include coating heads formed of a number of rolls, in particular including a press roll and a coating roll which is fed continuously with crosslinkable liquid silicone composition by means of a series of rolls adjoining one another. The flexible support strip circulates at high speed between the press roll and the coating roll so as to be coated on at least one of its faces with a silicone film intended to be crosslinked by means of crosslinking means arranged downstream of the coating head. These crosslinking means may for example be emitters of heat, of radiation (for example ultraviolet) or of electron beams.

In the pursuit of productivity, manufacturers of flexible supports coated with release silicone are demanding liquid silicone coating formulations suited to ever greater linear running speeds of the strip of flexible supports. The economic factor is obviously not inconsequential in this search for new silicone formulations for high-speed coating.

Now, it is known that high speeds on continuous coating machines are synonymous with problems of transfer of the liquid silicone film from the coating roll onto the running flexible support strip. These transfer problems ("splitting") are manifested in particular by the appearance of a mist or of an aerosol ("misting" or "fogging") in the surroundings of the coating head and, more particularly, at the points of contact between the rotating rolls and/or between the coating roll and the flexible support to be coated. The density of this mist or of this aerosol increases as the linear running speed and hence the rotational speed of the rolls increases.

The consequence of this phenomenon is first of all a loss of consumables, and especially a deposition of droplets of coating liquid on the support downstream (for example at the oven), which is detrimental to the quality of the coating.

In addition, this undesirable formation of mist has harmful consequences concerning industrial hygiene and the safety of operators, who are exposed in the vicinity of the roll coating device to a high level of aerosol. This can prove to be harmful.

Furthermore, the mist brings about rapid fouling of the roll coating device, leading to maintenance constraints and premature wear.

In order to guard against the consequences of this mist, a suction system enabling the capture of said mist is generally disposed around the coating head.

In addition, those skilled in the art know of a certain number of adjustments to the coating head for counteracting this phenomenon. Mention will be made of a number of examples thereof:

A. lowering the speed at the expense of productivity;
B. reducing the rate of silicone deposition at the expense of the properties of the flexible silicone-coated support it is sought to obtain (appearance, coverage, release property, mechanical properties);
C. increasing the difference between the tangential speed of the coating roll and the linear speed of the paper. However, beyond a certain difference, the homogeneity of the coated layer is severely disrupted. In addition, this allows reduction of the density of the mist without however eliminating it to a sufficient extent to permit any significant increase in the coating speed;
D. increasing the pressure between the coating roll and the press roll; here, too, within certain limits and without advantageous elimination of the mist formation phenomenon.

Another approach for combating the formation of mist in roll coating machines consists in acting on the formulation of the liquid silicone composition.

According to this approach, it is known to reduce the number-average degree of polymerization of the organopolysiloxanes constituting the silicone coating liquid and, as a consequence, to reduce the viscosity of the silicone coating bath for limiting the density of the mist.

These known methods suffer from the serious drawback of substantially modifying the properties and in particular the release property of the silicone-coated flexible support it is sought to obtain.

As an illustration of this approach by way of the silicone formulation, mention may be made of the international patent application WO2004/046248, which describes the use of star-branched silicone polymers employed as anti-misting additive for coating applications on flexible supports. The process for preparing these star-branched silicone polymers consists in incompletely reacting (by hydrosilylation) an organopolysiloxane comprising reactive ≡SiH units with a long-chain olefin in order to obtain a partially substituted polyhydroorganosiloxane which is then reacted by hydrosilylation with a vinyl silicone resin of MQ type and a long-chain diolefin. It is clear that such compositions are relatively complex and thus expensive to obtain. In addition, they remain capable of improvement as concerns combating the formation of mist in the silicone coating on high-speed rolls.

European patent EP0716115 describes a process for manufacturing a silicone coating composition, this composition being presented as enabling a reduction in the mist density. This process employs a polydimethylmethylhydrosiloxane with trimethylsilyl end groups with a degree of polymerization equal to 12, and also 0.01% of a polydimethylsiloxane substituted by perfluoroethylbutyl and methylvinyl functions, the ends of which are of the dimethylvinylsiloxyl type, and with a degree of polymerization equal to 300, and also polypropylene glycol and optionally a stearyl or oleyl alcohol. This results in polydimethylsiloxanes functionalized with polyoxypropylene groups. These functionalized polydimethylsiloxanes are combined with other polydimethylsiloxanes functionalized, for example, with hexenyl units and are also combined with a platinum-based hydrosilylation catalyst to form silicone coating compositions enabling a reduction in the formation of mist. The functionalization units may be hydrophobic residues such as stearic or oleic acid residues.

U.S. Pat. No. 4,806,391 relates to inks and varnishes based on silicone, and more precisely to a process for applying these inks/varnishes to a substrate using a roll coating machine operating at high speed. This patent discloses in particular compositions comprising polydimethylsiloxanes with vinyl end groups and with a viscosity at 25° C. of between 15 000 and 50 000 mPa·s. These liquid coating compositions also comprise a platinum-based catalyst and a rheological additive consisting of silica with a high specific surface area, in particular fumed silica.

U.S. Pat. No. 6,057,033 discloses silicone compositions intended to be coated on flexible supports for forming, after crosslinking by the cationic route under UV, a release coating. In addition to organopolysiloxanes, these compositions comprise cellulose fibers having an average length of between 15 and 100 µm and an average thickness of between 5 and 40 µm. The organopolysiloxanes employed are organopolysiloxanes functionalized with crosslinking groups of acryloxy or methacryloxy type, enabling crosslinking by the radical route under UV. The cellulose fibers incorporated into the composition make it possible to provide a solution to the technical problem of obtaining a non-brittle crosslinked silicone release coating. The cellulose fibers are presented as providing improvements as concerns the transfer of the silicone coating film onto the support, the resistance to cutting, the mechanical properties (tensile strength and tear strength), the fixing of the coating to the paper, the reduction of absorption of the coating liquid into the paper, and secondarily the reduction of the formation of mist. Concerning the latter point, U.S. Pat. No. 6,057,033 does not provide any quantitative element for assessing the reduction in mist brought about by the cellulosic fibers. There is every reason to believe that this reduction remains entirely unsatisfactory.

More recently, the U.S. Pat. No. 8,344,089 and WO2017220871 have described branched organopolysiloxanes which are useful as anti-misting additives.

SUMMARY

Against such a state of the art, one of the essential objects of the invention is to propose an efficient process for combating the appearance of mist during the coating of flexible supports with a liquid silicone composition which is a precursor to crosslinked coatings, this coating being performed using a roll coating device operating at high speed.

Another essential object of the invention is to propose an economical and simple process for combating the appearance of mist during the coating of flexible supports with a silicone composition which is intended to be crosslinked, this coating being performed in a roll coating device operating at high speed.

Another essential object of the invention is to provide a novel liquid silicone composition X which is a precursor of silicone coating(s) and which exhibits only a minor formation of mist during high-speed coating on rolls while still leading to crosslinked silicone coatings of very high quality, in particular in terms of bonding and adhesion to the support and of release profile with a very good stability over time.

Another essential object of the invention is that of proposing a process for combating the appearance of mist within the context of the coating of flexible supports, with a silicone composition that can be crosslinked to give release coatings, using a roll coating device.

All of these objects, among others, are achieved by the present invention, which firstly relates to a process for combating the appearance of mist during the coating of flexible supports with a liquid silicone composition X which is crosslinkable by polyaddition, by dehydrogenative condensation, by polycondensation, by the cationic route or by the radical route and is a precursor of silicone coating(s), comprising the following steps I) and II):

I) preparing said liquid silicone composition X and
II) coating said liquid silicone composition X on a flexible support using a roll coating device, said process being characterized in that in step I) said liquid silicone composition X is admixed with an anti-misting additive E obtained by reacting, preferably for 30 minutes to 12 hours, at a temperature of between 10° C. and 100° C.:

per 100 parts by weight of at least one organopolysiloxane F comprising from 10 to 80 mmol of (meth)acrylate, and preferably acrylate, functions per 100 g of organopolysiloxane F,
from 0.01 to 1 part by weight of at least one compound chosen from the group consisting of:
an organopolysiloxane G comprising from 85 to 400 mmol of (meth)acrylate, and preferably acrylate, functions per 100 g of organopolysiloxane G,
an organic compound H comprising from 300 to 1000 mmol of (meth)acrylate, and preferably acrylate, functions per 100 g of organic compound H, and
mixtures thereof, and
from 5 to 40 parts by weight of at least one organopolysiloxane N comprising from 10 to 80 mmol of amine functions per 100 g of organopolysiloxane N, the amounts of said compounds F, G, H and N employed being such that the initial molar ratio $Ri=nAcr/nH$ is between 3.8 and 7, where nAcr is the total number of moles of (meth)acrylate functions of compounds F, G and H and nH is the number of moles of hydrogen atoms bonded to a nitrogen atom of the organopolysiloxane N.

DETAILED DESCRIPTION OF A PREFERRED EMBODIMENT

Without wishing to limit the scope of the invention, the contacting of compounds F, G, H and N makes it possible to obtain a "branched" structure via the polyaddition reaction, called the Michael reaction, between the (meth)acrylate functions and the NH groups of the amine functions. The term "amine function" is intended to denote primary and secondary amines. The term "NH groups" is intended to mean the sum of NH groups contained in the primary and secondary amine functions. It should therefore be understood that one mole of primary amine functions contains two moles of hydrogen atoms bonded to a nitrogen atom and that one mole of secondary amine functions contains one mole of hydrogen atoms bonded to a nitrogen atom.

It must be understood for the whole document that the (meth)acrylate functions encompass acrylate functions and methacrylate functions. They are advantageously acrylate functions.

The branched structure obtained when the amounts of the compounds F, G, H and N employed are such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N, imparts upon the anti-misting additive E viscoelastic properties that are useful for combating the appearance of mist in a roll coating system operating at high speed. These viscoelastic properties are characterized by a ropy appearance of the anti-misting additive E.

The term "ropy appearance" is understood for the purposes of the present invention to mean the ability to form threads or filaments when the compound E is subjected to a certain strain. The thread breaks beyond a certain strain.

The term "high-speed coating" is understood to mean speeds of greater than or equal to 100 m/min, preferably of greater than 300 m/min (e.g. between 500 and 1000 m/min).

One of the advantages of this process is that of greatly reducing the appearance of mist in a system for coating flexible supports with silicone compositions. It is to the credit of the inventors to have selected particularly effective anti-misting additives E.

Another advantage of the use of this anti-misting additive E in the process according to the invention is the quality of the crosslinking by polymerization after coating onto the flexible supports. Specifically, the evaluation of the quality of the crosslinking or of the degree of crosslinking of a silicone coating is performed by evaluating the oily nature of the surface of the coating, by passing a finger over this coating when it exits a coating machine by way of a trade test known as the "smear" test. In addition, the crosslinking kinetics are absolutely advantageous, as illustrated by the low contents of extractibles obtained.

Another advantage of the use of this anti-misting additive E in the process according to the invention is that the properties of the crosslinked silicone coatings on the flexible supports are not impacted, in particular in terms of adhesion to the support and of release profile with a good stability over time.

The duration of the reaction between the compounds F, G, H and N for obtaining the anti-misting additive E depends on the nature of the compounds F, G, H and N and on the temperature. Those skilled in the art will know how to adapt the temperature and the reaction duration in order to obtain the anti-misting additive E. By way of indication, at ambient temperature the reaction duration may be between 30 minutes and 12 hours. To accelerate this reaction, it is possible to add an amount of isopropanol of between 0.1% and 2% to the reaction mixture.

According to one particular embodiment, the anti-misting additive E as described above is obtained at a reaction temperature of between 10 and 90° C., preferentially between 10 and 75° C. and even more preferentially between 15 and 50° C.

Advantageously, in the process according to the invention, the anti-misting additive E is obtained by reacting, preferably for 30 minutes to 12 hours, at a temperature of between 10° C. and 100° C.:

per 100 parts by weight of at least one organopolysiloxane F comprising from 10 to 80 mmol of (meth)acrylate, and preferably acrylate, functions per 100 g of organopolysiloxane F, from 0.01 to 0.6 part by weight of at least one compound chosen from the group consisting of:
- an organopolysiloxane G comprising from 85 to 400 mmol of (meth)acrylate, and preferably acrylate, functions per 100 g of organopolysiloxane G,
- an organic compound H comprising from 300 to 1000 mmol of (meth)acrylate, and preferably acrylate, functions per 100 g of organic compound H, and
- mixtures thereof, and from 5 to 40 parts by weight of at least one organopolysiloxane N comprising from 10 to 80 mmol of amine functions per 100 g of organopolysiloxane N, the amounts of said compounds F, G, H and N employed being such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N.

Even more advantageously, in the process according to the invention, the anti-misting additive E is capable of being obtained by reacting, for 30 minutes to 12 hours, at a temperature of between 10° C. and 100° C.:

per 100 parts by weight of at least one organopolysiloxane F comprising from 10 to 80 mmol of (meth)acrylate, and preferably acrylate, functions per 100 g of organopolysiloxane F, from 0.01 to 0.3 part by weight of at least one organopolysiloxane G comprising from 85 to 400 mmol of (meth)acrylate, and preferably acrylate, functions per 100 g of organopolysiloxane G, from 0.01 to 0.3 part by weight of at least one organic compound H comprising from 300 to 1000 mmol of (meth)acrylate, and preferably acrylate, functions per 100 g of organic compound H, and from 5 to 40 parts by weight of at least one organopolysiloxane N comprising from 10 to 80 mmol of amine functions per 100 g of organopolysiloxane N, the amounts of said compounds F, G, H and N employed being such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N.

Therefore, according to a preferred embodiment, the organopolysiloxane N is chosen from the organopolysiloxanes comprising siloxy units (I.1) and (I.2) of the following formulae:

$$Y_a Z_b^1 SiO_{\frac{4-(a+b)}{2}}$$ (I.1)

$$Z_c^2 SiO_{\frac{4-c}{2}}$$ (I.2)

in which:
a=1 or 2, b=0, 1 or 2 and a+b=1, 2 or 3
c=1, 2 or 3
the symbols Y, which may be identical or different, represent a functional group of formula (I.3):

$$-E^1-(NH-G)_h-(NH_2)_i$$ (I.3)

in which:
- h=0 or 1;
- i=0 or 1;
- h+i=1 or 2
- $E^1$ represents a divalent aliphatic, cycloaliphatic or aromatic hydrocarbon radical comprising from 1 to 30 carbon atoms, preferably aliphatic and containing from 1 to 10 carbon atoms;
- when it is present, G represents an aliphatic hydrocarbon radical comprising from 1 to 10 carbon atoms which is monovalent when i=0 and divalent when i=1;
- the symbols $Z^1$ and $Z^2$, which may be identical or different, represent a monovalent hydrocarbon radical having from 1 to 30 carbon atoms and optionally comprising one or more unsaturations and/or one or more fluorine atoms, a hydroxyl group or a radical —$OR^1$ with $R^1$ representing a linear, cyclic or branched $C_1$-$C_{10}$ hydrocarbon radical, and preferably $Z^1$ and $Z^2$ represent a monovalent hydrocarbon group chosen from the group consisting of alkyl groups having from 1 to 8 carbon atoms, alkenyl groups having from 2 to 6 carbon atoms and aryl groups having from 6 to 12 carbon atoms optionally comprising one or more fluorine atoms, a hydroxyl group, or a radical —$OR^1$ with $R^1$ representing a linear, cyclic or branched $C_1$-$C_{10}$ hydrocarbon radical, and even more preferentially chosen from the group consisting of a methyl, ethyl, propyl, 3,3,3-trifluoropropyl, vinyl, hydroxyl, ethoxyl, methoxyl, xylyl, tolyl and phenyl group;

said organopolysiloxane N comprising, per molecule, at least one siloxy unit (I.1) bearing at least one functional group of formula (I.3).

The organopolysiloxane N may have a linear, branched or cyclic structure. When linear organopolysiloxanes are concerned, these are essentially composed of "D" siloxy units, in particular chosen from the group consisting of the siloxy units $Y_2SiO_{2/2}$, $YZ^1SiO_{2/2}$ and $Z^2_2SiO_{2/2}$, and of "M" siloxy units, in particular chosen from the group consisting of the siloxy units $Y_3SiO_{1/2}$, $YZ^1_2SiO_{1/2}$, $Y_2Z^1SiO_{1/2}$ and $Z^2_3SiO_{1/2}$, Y, $Z^1$ and $Z^2$ being as defined above, it being understood that the organopolysiloxane N comprises, per molecule, at least one siloxy unit bearing at least one functional group of formula (I.3) defined above.

In a particularly preferred embodiment, the organopolysiloxane N is chosen from the organopolysiloxanes comprising siloxy units (I.1) and (I.2) of the following formulae:

(I.1)

(I.2)

in which:
- Y and $Z^1$ and $Z^2$ have the definitions given above;
- a=1 or 2, b=0, 1 or 2 and a+b=2 or 3
- c=2 or 3.

Particularly preferably, the organopolysiloxane N is chosen from organopolysiloxanes comprising units (I.1) chosen from the group consisting of $YZ^1SiO_{2/2}$ and $YZ^1_2SiO_{1/2}$ and units (I.2) chosen from the group consisting of $Z^2_2SiO_{2/2}$ and $Z^2_3SiO_{1/2}$, Y, $Z^1$ and $Z^2$ being as defined above, it being understood that the organopolysiloxane N comprises, per molecule, at least one siloxy unit bearing at least one functional group of formula (I.3) defined above.

Preferably, the organopolysiloxane N exhibits a degree of polymerization of between 2 and 5000, preferably of between 2 and 1500, and more preferably of between 2 and 500.

Preferably, the organopolysiloxane N comprises a number of siloxy units (I.1) of between 1 and 80, preferably of between 2 and 50, and more preferably of between 2 and 20.

Preferably, the organopolysiloxane N comprises from 10 to 60 mmol of amine functions per 100 g of organopolysiloxane N and more preferentially still from 10 to 50 mmol of amine functions per 100 g of organopolysiloxane N.

Preferably, the organopolysiloxane N is chosen from the compounds of the following formulae (II), (III), (IV) and (V):

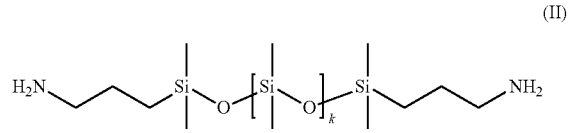
(II)

where k=1 to 1000, preferably 1 to 800

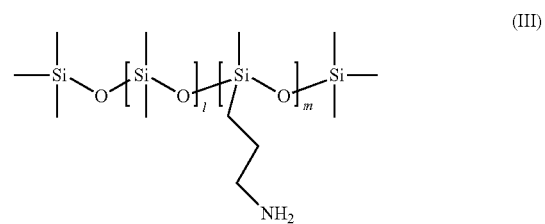
(III)

where l=1 to 1000, preferably 1 to 800, and m=1 to 150, preferably 1 to 100;

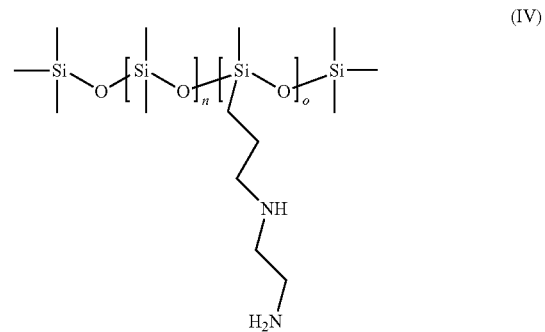
(IV)

where n=1 to 800, preferably 1 to 400, and o=1 to 100, preferably 1 to 50 and

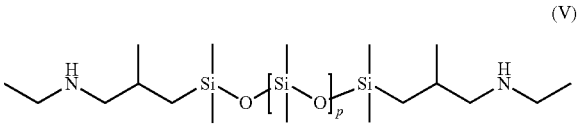
(V)

where p=1 to 1000, preferably 1 to 500.

It is understood that all of the preferred characteristics defining the organopolysiloxane N may be combined with one another.

Preferably, the organopolysiloxane N has a dynamic viscosity of between 1 and 100 000 mPa·s, preferably of between 100 and 50 000 mPa·s. Even more preferentially, the organopolysiloxane N has a dynamic viscosity of between 1000 and 20 000 mPa·s.

All of the viscosities involved in the present disclosure correspond to a magnitude of dynamic viscosity at 25° C. which is referred to as "Newtonian", that is to say the dynamic viscosity which is measured, in a manner known per se, with a Brookfield viscometer at a shear rate gradient that is sufficiently low for the measured viscosity to be independent of the rate gradient.

According to one embodiment, the organopolysiloxane F and the organopolysiloxane G are organopolysiloxanes comprising:

a1) at least one unit of the following formula (VI.1):

(VI.1)

in which:
the symbols $R^6$, which may be identical or different, each represent a linear or branched $C_1$ to $C_{18}$ alkyl group, a $C_6$ to $C_{12}$ aryl or aralkyl group, optionally substituted, preferably by halogen atoms, or an alkoxy radical —$OR^7$ with $R^7$ being a hydrogen atom or a hydrocarbon radical comprising from 1 to 10 carbon atoms, the symbols $Z^3$ are monovalent radicals of formula -y-(Y')$_n$ in which:
y represents a linear or branched $C_1$-$C_{18}$ polyvalent alkylene radical optionally extended by divalent $C_1$ to $C_4$ oxyalkylene or polyoxyalkylene radicals, which is optionally substituted by a hydroxy radical, Y' represents a monovalent alkenylcarbonyloxy radical, and n is equal to 1, 2 or 3, and preferably n is equal to 1, a is an integer equal to 0, 1 or 2, b is an integer equal to 1 or 2 and the sum a+b=1, 2 or 3; and a2) units of the following formula (VI.2):

(VI.2)

in which:
the symbols $R^8$, which may be identical or different, each represent a linear or branched $C_1$ to $C_{18}$ alkyl group, a $C_6$ to $C_{12}$ aryl or aralkyl group, optionally substituted, preferably by halogen atoms, and a is an integer equal to 0, 1, 2 or 3.

According to one embodiment, in the formula (VI.1) above, the alkenylcarbonyloxy radicals Y' mentioned above are chosen from the group consisting of: the acryloxy radical [CH$_2$=CH—CO—O—] and the methacryloxy radicals: [(CH$_3$)CH=CH—CO—O—] and [CH$_2$=C(CH$_3$)—CO—O—].

The symbol y in the units of formula (VII.1) is preferably chosen from the group consisting of:
—CH$_2$—;
—(CH$_2$)$_2$—;
—(CH$_2$)$_3$—;
—CH$_2$—CH(CH$_3$)—CH$_2$—;
—(CH$_2$)$_3$—O—CH$_2$—;
—(CH$_2$)$_3$—O—CH$_2$—CH(CH$_3$)—;
—(CH$_2$)$_3$—O—CH$_2$—CH(OH)—CH$_2$— and
—(CH$_2$)$_3$—O—CH$_2$—C(CH$_2$—CH$_3$)—(CH$_2$)$_2$—.

The organopolysiloxane F and the organopolysiloxane G may have a linear or branched structure and differ in their content of (meth)acrylate functions. The organopolysiloxane F comprises from 10 to 80 mmol of (meth)acrylate functions per 100 g of organopolysiloxane F and more preferentially from 20 to 60 mmol of (meth)acrylate functions per 100 g of organopolysiloxane F. The organopolysiloxane G comprises from 85 to 400 mmol of (meth)acrylate functions per 100 g of organopolysiloxane G and more preferentially from 150 to 250 mmol of (meth)acrylate functions per 100 g of organopolysiloxane G.

According to one embodiment, the organopolysiloxane F and the organopolysiloxane G are chosen from the compounds of the following formulae (VII), (VIII) and (IX):

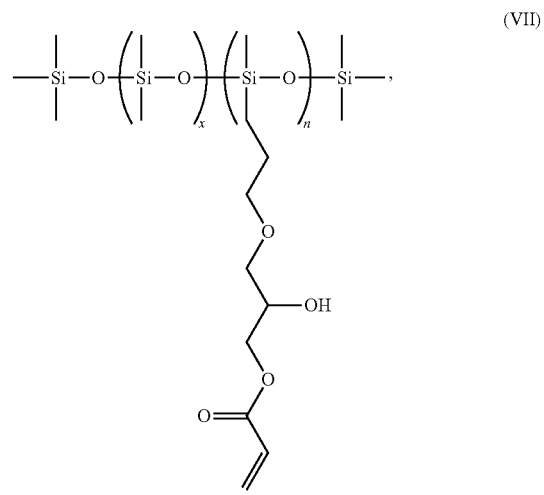

(VII)

where x =1 to 1000 and n = 1 to 100

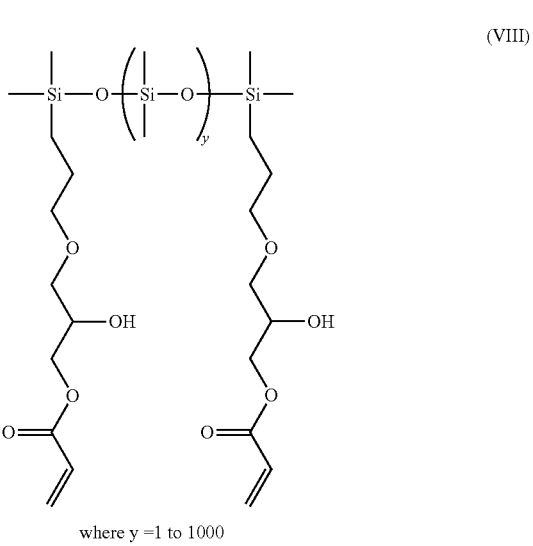

(VIII)

where y =1 to 1000

(IX)

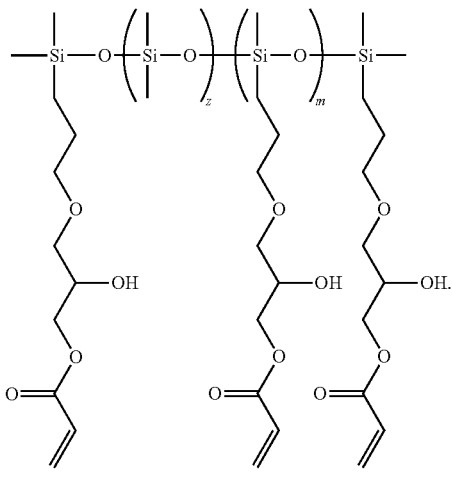

where z = 1 to 1000 and m = 1 to 100

According to one embodiment, the organic compound H comprises at least two (meth)acrylate functions. The organic compound H may comprise from 2 to 5 acrylate functions. The compound H is preferably chosen from the group consisting of: 1,6-hexanediol diacrylate, 1,4-butanediol diacrylate, 1,4-butanediol dimethacrylate, ethylene glycol diacrylate, diethylene glycol diacrylate, tetraethylene glycol diacrylate, tripropylene glycol diacrylate, neopentyl glycol diacrylate, 1,3-butylene glycol diacrylate, tetraethylene glycol dimethacrylate, triisopropylene glycol diacrylate, triethylene glycol diacrylate, trimethylolpropane triacrylate, trimethylolpropane trimethacrylate, pentaerythritol monohydroxytriacrylate, trimethylolpropane triethoxytriacrylate, pentaerythritol tetraacrylate, ditrimethylolpropane tetraacrylate and dipentaerythritol monohydroxypentaacrylate.

More preferentially, the compound H is chosen from the group consisting of: 1,3-butylene glycol diacrylate, 1,6-hexanediol diacrylate, 1,4-butanediol diacrylate, trimethylolpropane triacrylate and mixtures thereof.

Even more preferentially, the organic compound H is 1,6-hexanediol diacrylate.

According to a preferred embodiment, the initial molar ratio Ri=nAcr/nH is between 4.5 and 7, more preferentially between 5 and 7 and even more preferably between 5.3 and 6.8.

According to one particular embodiment, the reaction between the compounds is performed in the presence of isopropanol. In this case, the amount of isopropanol used is between 0.1 and 2 parts by weight per 100 parts by weight of organopolysiloxane F.

The anti-misting additive E according to the invention is employed in amounts sufficient to reduce the amount of mist during the coating. Of course, those skilled in the art may determine these amounts without difficulty by routine tests. Preferably, the anti-misting additive E according to the invention is employed in an amount of greater than 1.5 parts by weight and preferably of between 2 and 15 parts by weight and even more preferentially between 2.5 and 7 parts by weight relative to the total weight of the liquid silicone composition X which is a precursor of silicone coating(s).

Crosslinkable Compositions

The liquid silicone composition X which is a precursor of silicone coating(s) and employed in the process according to the invention is crosslinkable by polyaddition, by dehydrogenative condensation, by polycondensation, by the cationic route or by the radical route.

It is prepared by mixing its various components. Preferably, the mixing is performed at ambient temperature.

According to one embodiment of the process according to the invention, the liquid silicone composition X comprises:
  at least one organopolysiloxane A which is crosslinkable by polyaddition, by dehydrogenative condensation, by polycondensation, by the cationic route or by the radical route,
  optionally at least one crosslinking organosilicon compound B,
  optionally at least one catalyst or photoinitiator C of a nature chosen according to the type of reaction envisaged for said organopolysiloxane A,
  optionally, at least one adhesion modulator system K, and
  optionally at least one crosslinking inhibitor D.

According to one particular embodiment of the process according to the invention, in step I) the organopolysiloxane A of the liquid silicone composition X which is a precursor of silicone coating(s) is an organopolysiloxane which is crosslinkable by the radical route. The organopolysiloxane A is then an organopolysiloxane A1 comprising (meth)acrylate, and preferably acrylate, functions. Preferably, the organopolysiloxane A1 comprises:

a1) at least one unit of the following formula (VI.1):

(VI.1)

in which:
  the symbols $R^6$, which may be identical or different, each represent a linear or branched $C_1$ to $C_{18}$ alkyl group, a $C_6$ to $C_{12}$ aryl or aralkyl group, optionally substituted, preferably by halogen atoms, or an alkoxy radical —$OR^7$ with $R^7$ being a hydrogen atom or a hydrocarbon radical comprising from 1 to 10 carbon atoms,
  the symbols $Z^3$ are monovalent radicals of formula -y-(Y')$_n$ in which:
    y represents a linear or branched $C_1$-$C_{18}$ polyvalent alkylene radical optionally extended by divalent $C_1$ to $C_4$ oxyalkylene or polyoxyalkylene radicals, which is optionally substituted by a hydroxy radical,
    Y' represents a monovalent alkenylcarbonyloxy radical, and
    n is equal to 1, 2 or 3, and preferably n is equal to 1,
  a is an integer equal to 0, 1 or 2, b is an integer equal to 1 or 2 and the sum a+b=1, 2 or 3; and a2) units of the following formula (VI.2):

(VI.2)

in which:
  the symbols $R^8$, which may be identical or different, each represent a linear or branched $C_1$ to $C_{18}$ alkyl group, a $C_6$ to $C_{12}$ aryl or aralkyl group, optionally substituted, preferably by halogen atoms, and
  a is an integer equal to 0, 1, 2 or 3.

According to one embodiment, in the formula (VI.1) above, the alkenylcarbonyloxy radicals Y' mentioned above are chosen from the group consisting of: the acryloxy radical [$CH_2$=CH—CO—O—] and the methacryloxy radicals: [($CH_3$)CH=CH—CO—O—] and [$CH_2$=C($CH_3$)—CO—O—].

The symbol y in the units of formula (VII.1) is preferably chosen from the group consisting of:
—CH$_2$—;
—(CH$_2$)$_2$—;
—(CH$_2$)$_3$—;
—CH$_2$—CH(CH$_3$)—CH$_2$—;
—(CH$_2$)$_3$—O—CH$_2$—;
—(CH$_2$)$_3$—O—CH$_2$—CH(CH$_3$)—;
—(CH$_2$)$_3$—O—CH$_2$—CH(OH)—CH$_2$— and
—(CH$_2$)$_3$—O—CH$_2$—C(CH$_2$—CH$_3$)—(CH$_2$)$_2$—.

The organopolysiloxane A1 has a linear or branched structure. The organopolysiloxane A1 comprises from 10 to 400 mmol of (meth)acrylate functions per 100 g of organopolysiloxane A1 and more preferentially from 20 to 300 mmol of (meth)acrylate functions per 100 g of organopolysiloxane A1.

According to one embodiment, the organopolysiloxane A1 is chosen from the compounds of formulae (VII), (VIII) and (IX) as described above.

According to this variant of the invention, the photoinitiator C employed in the composition X with the organopolysiloxane A1 is a radical photoinitiator C1 which can be chosen from aromatic ketones which, after exposure to ultraviolet (UV) radiation:
  undergo homolytic cleavage at the α-position with respect to the carbonyl function (such as for acylphosphonate derivatives, acylphosphine oxide derivatives, derivatives of benzoin ethers and acetophenone derivatives) with the formation of two radical fragments, one of which is a benzoyl radical (type I photoinitiators), or
  form free radicals when they are promoted into their excited states by abstraction of a hydrogen from a hydrogen donor molecule (more commonly denoted "co-initiator"), thereby resulting in the formation of an inactive ketyl radical and of an initiator radical derived from the corresponding donor (type II photoinitiators).

Preferably, the radical photoinitiator C1 is chosen from the group consisting of α-hydroxy ketones, benzoin ethers, aromatic α-amino ketones and acylphosphine oxides. Preferably, the radical photoinitiator C1 is an acylphosphine oxide and more preferentially the radical photoinitiator C1 is ethyl (2,4,6-trimethylbenzoyl)phenylphosphinate (CAS No. 84434-11-7).

According to another embodiment of the invention, in step I) the organopolysiloxane A of the liquid silicone composition X which is a precursor of silicone coating(s) is an organopolysiloxane which is crosslinkable by polyaddition. The organopolysiloxane A is then an organopolysiloxane A2 comprising at least two siloxy units of formula (X.1) with optionally at least some of the other units being siloxy units of formula (X.2)

$$W_a Z^4_b SiO_{\frac{4-(a+b)}{2}} \quad (X.1)$$

$$Z^4_c SiO_{\frac{4-c}{2}} \quad (X.2)$$

in which formulae:
W is an alkenyl, preferably vinyl or allyl, group,
the symbols $Z^4$, which may be identical or different, represent:
  a linear or branched alkyl radical containing from 1 to 20 carbon atoms, optionally substituted by at least one halogen, preferably fluorine, the alkyl radicals preferably being methyl, ethyl, propyl, octyl and 3,3,3-trifluoropropyl,
  a cycloalkyl radical containing between 5 and 8 cyclic carbon atoms, which is optionally substituted,
  an aryl radical containing between 6 and 12 carbon atoms which is optionally substituted, and/or
  an aralkyl radical having an alkyl part containing between 5 and 14 carbon atoms and an aryl part containing between 6 and 12 carbon atoms, which is optionally substituted on the aryl part by halogens and/or alkyls,
a is 1 or 2, preferably is equal to 1, b is 0, 1 or 2 and a+b=1, 2 or 3, and
c=0, 1, 2 or 3.

Examples of organopolysiloxanes A2 which are crosslinkable by polyaddition are dimethylpolysiloxanes with dimethylvinylsilyl end groups, methylvinyldimethylpolysiloxane copolymers with trimethylsilyl end groups, methylvinyldimethylpolysiloxane copolymers with dimethylvinylsilyl end groups.

According to this variant, the crosslinking organosilicon compound B is a compound B2 comprising at least three siloxy units of formula (XI.1) with optionally at least some of the other units being siloxy units of formula (XI.2):

$$HL_c SiO_{(3-c)/2} \quad (XI.1)$$

$$L_g SiO_{(4-g)/2} \quad (XI.2)$$

in which:
H is a hydrogen atom,
the symbols L, which may be identical or different, represent:
  a linear or branched alkyl radical containing from 1 to 20 carbon atoms, optionally substituted by at least one halogen, preferably fluorine, the alkyl radicals preferably being methyl, ethyl, propyl, octyl and 3,3,3-trifluoropropyl,
  a cycloalkyl radical containing between 5 and 8 cyclic carbon atoms, which is optionally substituted,
  an aryl radical containing between 6 and 12 carbon atoms which is optionally substituted, and/or
  an aralkyl radical having an alkyl part containing between 5 and 14 carbon atoms and an aryl part containing between 6 and 12 carbon atoms, which is optionally substituted on the aryl part by halogens and/or alkyls.
c=0, 1 or 2, and
g=0, 1, 2 or 3.

Examples of crosslinking organosilicon compound B2 are, for example:
  dimethylpolysiloxane polymers with hydrodimethylsilyl end groups,
  poly(dimethylsiloxy)(methylhydrosiloxy) α,ω-dimethylhydrosiloxy polymers,
  MDD$^H$: copolymers with (dimethylsiloxy)(hydromethylsiloxy) units with trimethylsilyl end groups,
  M$^H$DD$^H$: copolymers with (dimethylsiloxy)(hydromethylsiloxy) units with hydrodimethylsilyl end groups,
  MD$^H$: hydromethylpolysiloxanes with trimethylsilyl end groups.

Still according to this variant, the catalyst C is a polyaddition catalyst C2. The polyaddition catalyst C2 can be composed of at least one metal belonging to the platinum group. This catalyst may in particular be chosen from compounds of platinum and of rhodium but also from silicon compounds such as those described in the patent applications WO2015004396 and WO2015004397, germanium compounds such as those described in the patent applications WO2016075414 or complexes of nickel, cobalt or iron such as those described in the patent applications WO2016071651, WO2016071652 and WO2016071654. The generally preferred catalyst is platinum. In this case, the amount by weight of the polyaddition catalyst C2, calculated as weight of platinum metal, is generally between 2 and 400 ppm.

According to another embodiment of the invention, in step I) the organopolysiloxane A of the liquid silicone composition X which is a precursor of silicone coating(s) is an organopolysiloxane which is crosslinkable by polycondensation. The organopolysiloxane A is then a linear or branched organopolysiloxane A3 bearing hydroxyl groups or hydrolyzable groups, for example alkoxy groups, which crosslink at ambient temperature via polycondensation reactions under the action of moisture, generally in the presence of a catalyst C3. The catalyst C3 is a catalyst of polycondensation reactions. Polycondensation catalysts are widely known to those skilled in the art. Without wishing to limit the invention, the catalyst C3 can inter alia be chosen from tin-based compounds widely known to those skilled in the art or from organic catalysts such as the guanidines described in the patent applications EP2268743 and EP2367867 or from the metal complexes based for example on Zn, Mo, Mg, etc. described in the patent applications EP2222626, EP2222756, EP2222773, EP2935489, EP2935490 and WO2015/082837. Still according to this variant, the crosslinking organosilicon compound B is a compound B3 which is a compound bearing at least 3 hydrolyzable groups, preferably alkoxy groups, such as for example a silicate, an alkyltrialkoxysilane or an aminoalkyltrialkoxysilane.

According to another embodiment of the invention, in step I) the organopolysiloxane A of the liquid silicone composition X which is a precursor of silicone coating(s) is an organopolysiloxane which is crosslinkable by dehydrogenative condensation. The organopolysiloxane A is then a linear, branched or crosslinked organopolysiloxane A4 bearing hydroxyl groups. According to this variant, the crosslinking organosilicon compound B is a compound B4 which is a linear, branched or crosslinked organopolysiloxane bearing hydrosilyl or SiH groups. The dehydrogenative condensation reaction between the organopolysiloxane A4 and the crosslinker B4 takes place in the presence of a catalyst C4. Without wishing to limit the invention, the catalyst C4 can be chosen from metal compounds based for example on platinum or iridium or organic compounds for example of guanidine type, such as described in the patent applications EP2443207 and EP2443208.

According to another embodiment of the invention, in step I) the organopolysiloxane A of the liquid silicone composition X which is a precursor of silicone coating(s) is an organopolysiloxane which is crosslinkable by the cationic route. The organopolysiloxane A is then an organopolysiloxane A5 comprising at least one reactive function G chosen from the group consisting of the functions: epoxy, alkenyl ether, oxetane and dioxolane. These organopolysiloxanes A5 crosslink in the presence of an effective amount of a photoinitiator C which is a cationic photoinitiator C5 of the onium salt type by way of activation by actinic radiation (UV) or by electron beams. Preferably, the photoinitiator C5 is an iodonium borate, for example as described in the documents EP-562897 and EP-2904021. A specific example is the following iodonium borate:

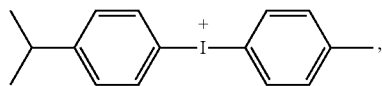

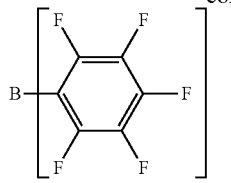

The organopolysiloxanes A5 which can be epoxy-functional or vinyloxy-functional organopolysiloxanes are described in particular in the patents DE-4 009 889, EP-0 396 130, EP-0 355 381, EP-0 105 341, FR-2 110 115, FR-2 526 800. Epoxy-functional organopolysiloxanes may be prepared by hydrosilylation reactions between oils comprising ≡SiH units and epoxy-functional compounds such as 1,2-epoxy-4-vinyl-4-cyclohexane (VCMX) or allyl glycidyl ether. Vinyloxy-functional organopolysiloxanes may be prepared by hydrosilylation reaction between oils comprising SiH units and vinyloxy-functional compounds such as allyl vinyl ether or allylvinyloxyethoxybenzene.

When it is present, the crosslinking inhibitor D is generally used to impart a certain pot-life upon the ready-to-use composition. These crosslinking inhibitors are in particular present when in step I) the organopolysiloxane A of the liquid silicone composition X which is a precursor of silicone coating(s) is an organopolysiloxane which is crosslinkable by polyaddition or dehydrogenation and when the catalyst C employed is based on platinum. The crosslinking inhibitor D is preferably chosen from acetylenic alcohols (ethynylcyclohexanol: ECH), diallyl maleates, triallyl isocyanurates, dialkyl maleates (diethyl maleates or dialkyl alkynedicarboxylates) (diethyl acetylenedicarboxylate) or else from organopolysiloxanes which are advantageously cyclic and substituted by at least one alkenyl, tetramethylvinylcyclotetrasiloxane being particularly preferred, or alkylated maleates. Acetylenic alcohols are useful retarders according to the invention. Mention may be made, by way of examples, of:

1-ethynylcyclohexan-1-ol;
3-methyldodec-1-yn-3-ol;
3,7,11-trimethyldodec-1-yn-3-ol;
1,1-diphenylprop-2-yn-1-ol;
3-ethyl-6-ethylnon-1-yn-3-ol;
3-methylpentadec-1-yn-3-ol.

In the liquid silicone composition X which is a precursor of silicone coating(s), it may be advantageous to employ at least one adhesion modulator system K, for enabling control of the release properties of the crosslinked silicone coating. By way of illustration, the adhesion modulator system K may be:

in the case of a formulation which crosslinks by polyaddition: a polyorganosiloxane resin of the formula $MD^{Vi}Q$; $MM^{Vi}Q$; $MM^{Vi}D^{Vi}Q$; $MM^{Vi}DD^{Vi}Q$; $MD^HQ$ or $MM^HQ$ (where Vi=vinyl group)

in the case of a formulation which crosslinks by polycondensation or dehydrogenative condensation: a polyorganosiloxane resin of formula $M^{OH}Q$, and in the case of a formulation which crosslinks under radiation: a polyorganosiloxane resin of formula $MD^HQ$ or $MM^HQ$.

It is recalled that:
the symbol "D" denotes a siloxy unit of formula $(CH_3)_2SiO_{2/2}$
the symbol "$D^{Vi}$" denotes a siloxy unit of formula $(CH_3)(vinyl)SiO_{2/2}$ the symbol "$D^H$" denotes a siloxy unit of formula $(CH_3)HSiO_{2/2}$ the symbol "M" denotes a siloxy unit of formula $(CH_3)_3SiO_{1/2}$ the symbol "$M^{Vi}$" denotes a siloxy unit of formula $(CH_3)_2(vinyl)SiO_{1/2}$ the symbol "$M^H$" denotes a siloxy unit of formula $(CH_3)_2HSiO_{1/2}$ the symbol "$M^{OH}$" denotes a siloxy unit of formula $(CH_3)_2(OH)SiO_{1/2}$ and the symbol "Q" denotes a siloxy unit of formula $SiO_{4/2}$.

According to a preferred variant of the process according to the invention, in step I) the liquid silicone composition X which is a precursor of silicone coating(s) and to which the anti-misting additive E is added comprises:

at least one organopolysiloxane A1 which is crosslinkable by the radical route, at least one radical photoinitiator C1; and optionally at least one adhesion modulator system K.

The organopolysiloxane A1 and the photoinitiator C1 are as defined above.

According to a preferred variant of the process according to the invention, in step I) the liquid silicone composition X which is a precursor of silicone coating(s) and to which the anti-misting additive E is added comprises:

at least one organopolysiloxane A2 which is crosslinkable by polyaddition, at least one crosslinking organosilicon compound B2, at least one catalyst C2, optionally at least one adhesion modulator system K, and optionally at least one crosslinking inhibitor D.

The organopolysiloxane A2, the crosslinker B2, the catalyst C2, the adhesion modulator system K and the crosslinking inhibitor D are as defined above.

According to another variant of the process according to the invention, in step I) the liquid silicone composition X which is a precursor of silicone coating(s) and to which the anti-misting additive E is added comprises:

at least one organopolysiloxane A3 which is crosslinkable by polycondensation, at least one anti-misting additive E as described above, at least one crosslinking organosilicon compound B3, at least one catalyst C3, and optionally at least one adhesion modulator system K.

The organopolysiloxane A3, the crosslinker B3, the catalyst C3 and the adhesion modulator system K are as defined above.

According to another variant of the process according to the invention, in step I) the liquid silicone composition X which is a precursor of silicone coating(s) and to which the anti-misting additive E is added comprises:

at least one organopolysiloxane A4 which is crosslinkable by dehydrogenative condensation, at least one crosslinking organosilicon compound B4, at least one catalyst C4, and optionally at least one adhesion modulator system K, and optionally at least one crosslinking inhibitor D.

The organopolysiloxane A4, the crosslinker B4, the catalyst C4, the adhesion modulator system K and the crosslinking inhibitor D are as defined above.

According to another variant of the process according to the invention, in step I) the liquid silicone composition X which is a precursor of silicone coating(s) and to which the anti-misting additive E is added comprises:

at least one organopolysiloxane A5 which is crosslinkable by the cationic route, at least one photoinitiator C5 and optionally at least one adhesion modulator system K.

The organopolysiloxane A5, the photoinitiator C5 and the adhesion modulator system K are as defined above.

In addition to these constituents, the liquid silicone composition X which is a precursor of silicone coating(s) may also contain at least one additive customary in silicone compositions which crosslink by polyaddition, by polycondensation, by dehydrogenative condensation, by the cationic route or by the radical route. Mention may be made, for example, of pigments and fillers P. The fillers P are preferably mineral fillers. These fillers may be provided in the form of very finely divided products; these fillers include fumed silicas and precipitated silicas: their specific surface area is for example greater than or equal to 40 m$^2$/g, and is more often within the range of 40-300 m$^2$/g. These fillers P may also be provided in the form of more coarsely divided products with a mean particle diameter of for example greater than 1 μm. As examples of such fillers, mention may be made of ground quartz, diatomaceous silicas, oxides of iron, of zinc and of magnesium, the various forms of alumina (hydrated or non-hydrated); their specific surface area is for example less than or equal to 30 m$^2$/g. The fillers P may have been surface modified by treatment with the various organosilicon compounds usually employed for this use. Thus, these organosilicon compounds may be organochlorosilanes, diorganocyclopolysiloxanes, hexaorganodisiloxanes, hexaorganodisilazanes or diorganocyclopolysilazanes. The treated fillers contain, in most cases, from 2% to 20% of their weight of organosilicon compounds.

Another subject of the invention relates to the process for preparing the anti-misting additive E by reacting, preferably for 30 minutes to 12 hours, at a temperature of between 10° C. and 100° C.:

per 100 parts by weight of at least one organopolysiloxane F comprising from 10 to 80 mmol of (meth)acrylate functions per 100 g of organopolysiloxane F, from 0.01 to 1 part by weight of at least one compound chosen from the group consisting of:

an organopolysiloxane G comprising from 85 to 400 mmol of (meth)acrylate, and preferably acrylate, functions per 100 g of organopolysiloxane G, an organic compound H comprising from 300 to 1000 mmol of (meth)acrylate, and preferably acrylate, functions per 100 g of organic compound H, and mixtures thereof, and from 5 to 40 parts by weight of at least one organopolysiloxane N comprising from 10 to 80 mmol of amine functions per 100 g of organopolysiloxane N, the amounts of said compounds F, G, H and N employed being such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N.

Advantageously, for preparing the anti-misting additive E in accordance with the process according to the invention, the following are reacted, preferably for 30 minutes to 12 hours, at a temperature of between 10° C. and 100° C.:

per 100 parts by weight of at least one organopolysiloxane F comprising from 10 to 80 mmol of (meth)acrylate, and preferably acrylate, functions per 100 g of organopolysiloxane F, from 0.01 to 0.6 part by weight of at least one compound chosen from the group consisting of:

an organopolysiloxane G comprising from 85 to 400 mmol of (meth)acrylate, and preferably acrylate, functions per 100 g of organopolysiloxane G, an organic compound H comprising from 300 to 1000 mmol of (meth)acrylate, and preferably acrylate, functions per 100 g of organic compound H, and mixtures thereof, and from 5 to 40 parts by weight of at least one organopolysiloxane N comprising from 10 to 80 mmol of amine functions per 100 g of organopolysiloxane N, the amounts of said compounds F, G, H and N employed being such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N.

Advantageously, for preparing the anti-misting additive E in accordance with the process according to the invention, the following are reacted, preferably for 30 minutes to 12 hours, at a temperature of between 10'C and 100° C.:

per 100 parts by weight of at least one organopolysiloxane F comprising from 10 to 80 mmol of (meth)acrylate, and preferably acrylate, functions per 100 g, from 0.01 to 0.3 part by weight of at least one organopolysiloxane G comprising from 65 to 300 mmol of (meth)acrylate, and preferably acrylate, functions per 100 g, from 0.01 to 0.3 part by weight of at least one organic compound H comprising from 300 to 1000 mmol of (meth)acrylate, and preferably acrylate, functions per 100 g, and from 5 to 40 parts by weight of at least one organopolysiloxane N comprising from 10 to 80 mmol of amine functions per 100 g, the amounts of said compounds F, G, H and N employed being such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N.

Another subject of the invention is the anti-misting additive E capable of being obtained by the process according to the invention described above. These anti-misting additives E have the advantage of possessing the viscoelastic properties required for having excellent behavior as anti-misting additives.

Another subject of the invention relates to a liquid silicone composition X which is a precursor of silicone coating(s) and which is crosslinkable by polyaddition, by dehydrogenative condensation, by polycondensation, by the cationic route or by the radical route, comprising an anti-misting additive E obtained by the process according to the invention described above.

Another subject of the invention relates to a liquid silicone composition X which is a precursor of silicone coating(s) and comprises:
at least one organopolysiloxane A which is crosslinkable by polyaddition, by dehydrogenative condensation, by polycondensation, by the cationic route or by the radical route,
at least one anti-misting additive E capable of being obtained by the process above,
optionally at least one crosslinking organosilicon compound B,
optionally at least one catalyst or photoinitiator C of a nature chosen according to the type of reaction envisaged for said organopolysiloxane A,
optionally, at least one adhesion modulator system K, and
optionally at least one crosslinking inhibitor D.

The organopolysiloxane A, the anti-misting additive E, the catalyst or photoinitiator C, the adhesion modulator system K and the crosslinking inhibitor D are as defined above.

According to a variant of the invention, the liquid silicone composition X which is a precursor of silicone coating(s) comprises:
at least one organopolysiloxane A1 which is crosslinkable by the radical route,
at least one anti-misting additive E capable of being obtained by the process above,
at least one radical photoinitiator C1; and
optionally, at least one adhesion modulator system K.

The organopolysiloxane A1, the anti-misting additive E, the photoinitiator C and the adhesion modulator system K are as defined above.

According to another variant of the invention, the liquid silicone composition X which is a precursor of silicone coating(s) comprises:
at least one organopolysiloxane A2 which is crosslinkable by polyaddition,
at least one anti-misting additive E capable of being obtained by the process above,
at least one crosslinking organosilicon compound B2,
at least one catalyst C2,
optionally, at least one adhesion modulator system K, and
optionally at least one crosslinking inhibitor D.

The organopolysiloxane A2, the anti-misting additive E, the crosslinker B2, the catalyst C2, the adhesion modulator system K and the crosslinking inhibitor D are as defined above.

According to another preferred embodiment, the liquid silicone composition X which is a precursor of silicone coating(s) comprises:
at least one organopolysiloxane A3 by polycondensation,
at least one anti-misting additive E capable of being obtained by the process above,
at least one crosslinking organosilicon compound B3,
at least one catalyst C3, and
optionally, at least one adhesion modulator system K.

The organopolysiloxane A3, the anti-misting additive E, the crosslinker B3, the catalyst C3 and the adhesion modulator system K are as defined above.

According to another preferred embodiment, the liquid silicone composition X which is a precursor of silicone coating(s) comprises:
at least one organopolysiloxane A4 which is crosslinkable by dehydrogenative condensation,
at least one anti-misting additive E capable of being obtained by the process above,
at least one crosslinking organosilicon compound B4,
at least one catalyst C4 of a nature, and
optionally, at least one adhesion modulator system K, and
optionally at least one crosslinking inhibitor D.

The organopolysiloxane A4, the anti-misting additive E, the crosslinker B4, the catalyst C4, the adhesion modulator system K and the crosslinking inhibitor D are as defined above.

According to another preferred embodiment, the liquid silicone composition X which is a precursor of silicone coating(s) comprises:
at least one organopolysiloxane A5 which is crosslinkable by the cationic route,
at least one anti-misting additive E capable of being obtained by the process above,
at least one photoinitiator C5, and
optionally, at least one adhesion modulator system K.

The organopolysiloxane A5, the anti-misting additive E, the photoinitiator C5 and the adhesion modulator system K are as defined above.

The final subject of the invention relates to the use of the anti-misting additive E as defined above for reducing the appearance of mist during the coating of flexible supports with a liquid silicone composition X which is a precursor of silicone coating(s).

It is thus apparent that the invention provides an original, simple, economic and reliable means for combating the production of mist during the coating of flexible supports (for example made of paper, of synthetic polymer (polyolefin, polyester, etc.), or else of textile) in roll coating devices operating at high speed. The result in practice in industrial terms is that running speeds can be increased without appearance of this mist phenomenon which is harmful to the quality of the coating. The means for combating mist formation provided by the invention also has the significant advantage of not harming the qualities of appearance, the coverage, the release properties, or else the mechanical properties (rub-off) of the crosslinked silicone coating it is sought to obtain on at least one of the faces of the flexible support.

In addition, the reduction of mist significantly improves the hygiene and safety conditions for the personnel stationed around the industrial silicone roll coating devices operating at high speed.

The examples which follow are provided to illustrate particular embodiments of the invention without, however, limiting the scope of the invention to these simple embodiments.

EXAMPLES

I) Preparation of Anti-Misting Additives E:

In the examples which follow, the following compounds were employed.

F1: Organopolysiloxane of the following formula with 31 mmol of acrylate functions per 100 grams.

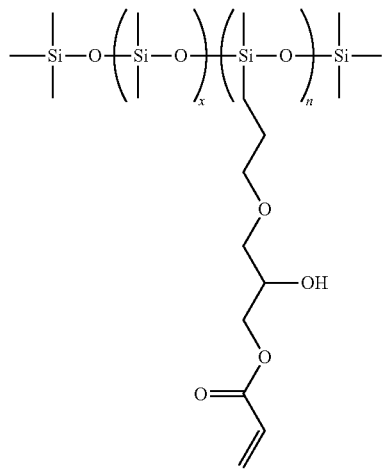

F2: Silmer ACR Di-50®, supplier Siltech Corporation, which is a dimethylpolysiloxane with two acrylate functions at the chain ends with 50 mmol of acrylate functions per 100 grams.

G1: Organopolysiloxane of the same overall formula as F1 with 199 mmol of acrylate functions per 100 grams.

H1: Hexanediol acrylate with 885 mmol of acrylate functions per 100 grams.

N1: Organopolysiloxane of the following formula with 43 mmol of amine functions per 100 grams.

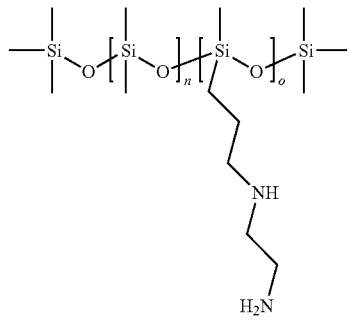

Isopropanol

Synthesis of the Branched Polymers:

All of the compounds tested as anti-misting additives were synthesized by the same process.

The compounds F, G, H and N are introduced into a flask in the proportions detailed in table 1 below. A small amount of isopropanol, between 0.1 and 1 gram, may optionally be introduced to accelerate the reaction. The flask is closed and then kept closed, with agitation on a mat for 2 to 24 hours at ambient temperature.

Ri represents the initial molar ratio between the total number of moles of (meth)acrylate functions of compounds F, G and H and the number of moles of hydrogen atoms bonded to a nitrogen atom of the organopolysiloxane N. A qualitative evaluation of the ropy nature of the polymer obtained is then performed using a spatula (formation of threads or lack thereof). The ropy nature is required for the compound to impart anti-misting properties when it is added to a silicone composition.

| Parts by weight | Comparative 1 | Example 1 | Example 2 | Example 3 | Example 4 | Example 5 | Comparative 2 |
|---|---|---|---|---|---|---|---|
| F1 | 100 | 100 | 100 | 100 | | | 100 |
| F2 | | | | | 100 | 100 | |
| G1 | 0.050 | 0.033 | 0.029 | 0.028 | | 0.047 | 0.021 |
| H1 | 0 | 0.033 | 0.029 | 0.028 | 0.047 | 0 | 0.021 |
| N1 | 20 | 13.3 | 11.8 | 11.1 | 18.9 | 18.9 | 10 |

-continued

| Parts by weight | Comparative 1 | Example 1 | Example 2 | Example 3 | Example 4 | Example 5 | Comparative 2 |
|---|---|---|---|---|---|---|---|
| Ri | 3.62 | 5.47 | 6.19 | 6.55 | 6.18 | 6.14 | 7.26 |
| Ropy nature | NO | YES | YES | YES | YES | YES | NO |

II) Test as Anti-Misting Additive

The branched polymers of examples 2 and 3, having a ropy nature, were tested as anti-misting additives.

Description of the Test

To analyze and quantify the mist produced in a roll coating device operating at high speed, a "pilot misting" was implemented on the laboratory scale using a nephelometer (Portable Dust Monitor Series 1.100 from GRIMM) which allows measurement of the density of particles having a size of greater than 0.5 μm, i.e. all of the particles emitted into the atmosphere.

The coating device (provided by the company Ermap, France) comprises 2 rolls and allows running of a paper web at a linear speed of 50 to 920 m/min. The two press/coating rolls have a diameter of 10 cm. The press roll is covered with rubber and the coating roll is covered with chromium. The coating roll was in the shape of a dumbbell so that the speed of the two rolls is synchronous. The press roll, which can be driven by a motor, is in contact with the coating roll under constant pressure. The liquid coating silicone is poured directly into the gap between the two rolls. The amount of fluid used is 0.25 ml.

The nephelometer measures the density of particles in the mist or aerosol, expressed in $\mu g/m^3$.

The anti-misting performance of the various additives was tested in a silicone composition which was crosslinkable by the radical route and composed of 95 parts of compound A1 and 5 parts of compound A2, both having the following formula:

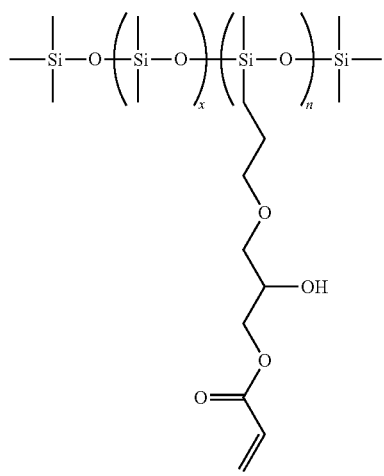

with for A1 (x=82 and n=7) and for A2 (x=220 and n=4) and one part of ethyl (2,4,6-trimethylbenzoyl)phenylphosphinate (CAS No. 84434-11-7) as photoinitiator.

Various amounts of the polymers obtained from examples 2 and 3 prepared according to table 1 are added to the composition described above. The mixture is stirred to homogenize it.

The results of the mist density measurement are expressed in $\mu g/m^3$ and presented in table 2 below:

TABLE 2

| | Mist density measurement in $\mu g/m^3$ | | | | |
|---|---|---|---|---|---|
| Speed m/min | Without additive | E2 5 parts | E3 1 part | E3 5 parts | E3 10 parts |
| 200 | 9560 | 141 | 1721 | 83 | 45 |
| 400 | 37 696 | 1112 | 12 801 | 982 | 182 |
| 600 | 55 074 | 6154 | 23 811 | 3102 | 1098 |

The products E2 and E3 have a very favorable anti-misting behavior in the silicone compositions. The products E2 and E3 also have the advantage of having good solubility in the silicone composition. When 5 parts by weight of anti-misting additive E2 or E3 are used, the mist density measured at 600 m/min is reduced by at least a factor of 10.

II) Preparation of a Silicone Release Coating on a Polymer Support

The silicone composition of table 2, comprising five parts by weight of additive E3, was coated using a Rotomec pilot coating system onto a polyester support. The machine speed is 50 m/min with a mercury lamp power fixed at 100 W/cm for effecting the crosslinking under UV. This deposition is between 0.9 and 1.1 $g/m^2$. On exiting the machine, "smear", "rub-off" and "dewetting" tests are performed and extractible silicones are measured.

Tests Performed on the Supports Coated with Silicone Release Coatings:

Smear: Qualitative inspection of the surface polymerization by the finger trace method, which consists in:
  Placing the sample of silicone-coated support to be inspected on a flat and rigid surface;
  Making a trace with the tip of a finger by pressing moderately but firmly; and
  Examining the trace thus made by eye, preferably under raking light. It is thus possible to see the presence of even a very light trace by the difference in surface brightness.

The assessment is qualitative. The "smear" test is quantified using the following grades:
A: very good, no trace of the finger
B: a little less good, trace barely visible
C: clear trace
D: very clear trace with an oily appearance of the surface, product barely polymerized, i.e. a grade from A to D, from the best result to the worst.

Rub-off: Inspection of the ability of the silicone to adhere to the flexible support by gumming on passing a finger back and forth, which consists in:
  Placing the sample of silicone-coated support to be inspected on a flat and rigid surface, the silicone being on the upper face,
  Passing the tip of the finger to-and-fro 10 times (over a length of approximately 10 cm) while pressing moderately but firmly, Examining the appearance of gumming by eye. Gumming corresponds to the appearance of a fine white powder or of small beads which roll beneath the finger.

The assessment is qualitative. The gumming is quantified using the following grades:

10: very good, no appearance of gumming after 10 to-and-fro passes

1: very poor, gumming after the first outgoing pass

The grade corresponds to the number of to-and-fro passes (from 1 to 10) starting from which gumming appears.

I.e., a grade from 1 to 10, from the poorest to best result.

Dewetting: Assessment of the degree of polymerization of the silicone layer by evaluating the transfer of silicone to an adhesive brought into contact with the coating using an ink of standardized surface tension. The method is as follows:

Select a sample of approximately 20×5 cm from the silicone-coated paper to be characterized, taken in the direction of unwinding (machine direction).

Cut off a length of ≈15 cm of adhesive tape and then deposit it adhesive side down onto the paper to be inspected, without folds, by exerting a pressure 10 times by sliding the finger along the length of the adhesive tape. ("Scotch" adhesive tape from 3M, reference 610, width: 25 mm).

Lift off the adhesive tape and deposit it flat, adhesive part facing upwards.

Using a (disposable) cotton bud, deposit a trace of ink on the adhesive part of the tape over a length of approximately 10 cm (SHERMAN or FERARINI and BENELI brand inks with a surface tension ≈30 dynes/cm and a viscosity of 2 to 4 mPa/s). Start the timer immediately.

The phase of the dewetting phenomenon is considered to have commenced when the line of ink changes appearance; stop the timer at this point.

Deposition of the ink on the adhesive part of the tape should be done within 2 minutes following the coating with silicone.

If the result obtained is <10 seconds, it is considered that there is migration of silicone to the adhesive, and that the polymerization is not complete.

A grade will be given from 0 to 10, corresponding to the time elapsed in seconds before observation of the dewetting phenomenon.

If the result obtained is 10 seconds, it is considered that the polymerization is complete. In this case, a grade of 10 will be given, signifying that the result is very good.

Note the grade obtained and the ink used (name, brand, surface tension, viscosity).

Extractibles: Measurement of the amount of silicone which is not grafted to the network formed during the polymerization. These silicones are extracted from the film by immersion of the sample on departing the machine in MIBK for a minimum of 24 h. It is measured by flame absorption spectroscopy. The content of extractibles should be kept below 8% and preferably below 6%.

The results of the various trade tests are presented in the following table.

TABLE 2

Results of the trade tests on the coatings

| Formulation - | Without additive | 5 parts of additive E3 |
|---|---|---|
| Deposition (g/m$^2$) | 1.01 | 0.97 |
| Smear | A | A |
| Rub-off | 10 | 10 |
| Dewetting | 10 | 10 |
| In-Line Extractibles (100 cm$^2$) % | 3.2 | 4.6 |

The trade tests of the formulation comprising 5 parts of anti-misting additives E3 are satisfactory. There is no degradation in the properties of the coating obtained.

Release: Measurements of peeling forces were performed with the standardized adhesive TESA 7475 on the support coated with silicone coating. Test specimens of the multilayer article (adhesive in contact with silicone surface) were stored for 1 day at 23° C., 1 day at 70° C. and 7 days at 70° C. under the pressure conditions required, and then tested at low peeling speed in accordance with the FINAT 3 (FTM 3) test known to those skilled in the art.

The detachment force is expressed in cN/inch and is measured using a dynamometer, after placing the samples under pressure either at ambient temperature (23° C.) or at higher temperature for accelerated aging tests (generally 70° C.).

The results are presented in table 3 below.

TABLE 3

| | Detachment force in cN/inch | |
|---|---|---|
| Formulation | Without additive | 5 parts of additive E3 |
| 1 d @ 23° C. | 9.7 | 14 |
| 1 d @ 70° C. | 9.1 | 17 |
| 7 d @ 70° C. | 12.3 | 24 |

An increase in the detachment forces is observed but they remain entirely satisfactory for the application.

Subsequent adhesion ("SubAd" in the tables): Measurement verifying the preservation of adhesiveness of the adhesives (TESA 7475) which have been brought into contact with the silicone coating in accordance with the FINAT 11 (FTM 11) test known to those skilled in the art. Here, the reference test specimen is made of PET and the adhesives are left in contact with the silicone surface being tested for 1 day at 70° C. and 7 days at 70° C.

The results are given in % conservation of adhesive force of the reference tape:

CA=(Fm2/Fm1)×100 in % with:

Fm2=Average tape detachment forces after contact with the silicone surface for 20 h; and Fm1=Average tape detachment forces without contact with the silicone surface.

The results are reported in the following table 4.

TABLE 4

| Formulation | Subsequent adhesion (in %) | |
|---|---|---|
| | Without additive | 5 parts of additive E3 |
| 1 d @ 70° C. | 79.7 | 72.6 |
| 7 d @ 70° C. | 80.4 | 70.1 |

The detachment force and the subsequent adhesion measurement are satisfactory even after aging.

The invention claimed is:

1. A process for combating appearance of mist during coating of one or more flexible supports with a liquid silicone composition X which is crosslinkable by polyaddition, by dehydrogenative condensation, by polycondensation, by a cationic route or by a radical route and is a precursor of silicone coating(s), comprising the following I) and II):

I) preparing said liquid silicone composition X and
II) coating said liquid silicone composition X on a flexible support using a roll coating device, wherein, in I) said liquid silicone composition X is admixed with an anti-misting additive E obtained by reacting, optionally for 30 minutes to 12 hours, at a temperature of between 10° C. and 100° C.:

per 100 parts by weight of at least one organopolysiloxane F comprising from 10 to 80 mmol of (meth)acrylate, and optionally acrylate, functions per 100 g of organopolysiloxane F, from 0.01 to 1 part by weight of at least one compound chosen from the group consisting of:
an organopolysiloxane G comprising from 85 to 400 mmol of (meth)acrylate, and optionally acrylate, functions per 100 g of organopolysiloxane G,
an organic compound H comprising from 300 to 1000 mmol of (meth)acrylate, and optionally acrylate, functions per 100 g of organic compound H, and
mixtures thereof, and from 5 to 40 parts by weight of at least one organopolysiloxane N comprising from 10 to 80 mmol of amine functions per 100 g of organopolysiloxane N,
the amounts of said compounds F, G, H and N employed being such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N.

2. The process for combating appearance of mist during coating of one or more flexible supports as claimed in claim 1, in which the organopolysiloxane N is chosen from the organopolysiloxanes comprising siloxy units (I.1) and (I.2) of the following formulae:

$$Y_a Z^1_b SiO_{\frac{4-(a+b)}{2}}; \qquad (I.1)$$

$$Z^2_c SiO_{\frac{4-c}{2}} \qquad (I.2)$$

in which:
a=1 or 2, b=0, 1 or 2 and a+b=1, 2 or 3
c=1, 2 or 3
symbol Y, which may be identical or different, represents a functional group of formula (I.3):

$$-E^1-(NH-G)_h-(NH_2)_i \qquad (I.3)$$

in which:
h=0 or 1;
i=0 or 1;
h+i=1 or 2;
$E^1$ represents a divalent aliphatic, cycloaliphatic or aromatic hydrocarbon radical comprising from 1 to 30 carbon atoms, optionally aliphatic and containing from 1 to 10 carbon atoms;
when it is present, G represents an aliphatic hydrocarbon radical comprising from 1 to 10 carbon atoms which is monovalent when i=0 and divalent when i=1;
the symbols $Z^1$ and $Z^2$, which may be identical or different, represent a monovalent hydrocarbon radical having from 1 to 30 carbon atoms and optionally comprising one or more unsaturations and/or one or more fluorine atoms, a hydroxyl group or a radical —$OR^1$ with $R^1$ representing a linear, cyclic or branched $C_1$-$C_{10}$ hydrocarbon radical, and optionally $Z^1$ and $Z^2$ represent a monovalent hydrocarbon group chosen from the group consisting of alkyl groups having from 1 to 8 carbon atoms, alkenyl groups having from 2 to 6 carbon atoms and aryl groups having from 6 to 12 carbon atoms optionally comprising one or more fluorine atoms, a hydroxyl group, or a radical —$OR^1$ with $R^1$ representing a linear, cyclic or branched $C_1$-$C_{10}$ hydrocarbon radical, and optionally chosen from the group consisting of a methyl, ethyl, propyl, 3,3,3-trifluoropropyl, vinyl, hydroxyl, ethoxyl, methoxyl, xylyl, tolyl and phenyl group; said organopolysiloxane N comprising, per molecule, at least two siloxy units (I.1) bearing at least one functional group of formula (I.3).

3. The process for combating appearance of mist during coating of one or more flexible supports as claimed in claim 2, in which the organopolysiloxane N is chosen from the organopolysiloxanes comprising siloxy units (I.1) and (I.2) of the following formulae:

$$Y_a Z^1_b SiO_{\frac{4-(a+b)}{2}}; \qquad (I.1)$$

$$Z^2_c SiO_{\frac{4-c}{2}} \qquad (I.2)$$

in which:
a=1 or 2, b=0, 1 or 2 and a+b =2 or 3
c=2 or 3.

4. The process for combating appearance of mist during coating of one or more flexible supports as claimed in claim 1, in which the organopolysiloxanes F and G comprise:
a1) at least one unit of the following formula (VI.1):

$$R^6_a Z^3_b SiO_{(4-a-b)/2} \qquad (VI.1)$$

in which formula:
the symbols $R^6$, which may be identical or different, each represent a linear or branched $C_1$ to $C_{18}$ alkyl group, a $C_6$ to $C_{12}$ aryl or aralkyl group, optionally substituted, optionally by halogen atoms, or an alkoxy radical —$OR^7$ with $R^7$ being a hydrogen atom or a hydrocarbon radical comprising from 1 to 10 carbon atoms,
the symbols $Z^3$ are monovalent radicals of formula -y-(Y')$_n$ in which:

y represents a linear or branched $C_1$-$C_{18}$ polyvalent alkylene radical optionally extended by divalent $C_1$ to $C_4$ oxyalkylene or polyoxyalkylene radicals, which is optionally substituted by a hydroxy radical, Y' represents a monovalent alkenylcarbonyloxy radical, and n is equal to 1, 2 or 3, and optionally n is equal to 1, a is an integer equal to 0, 1 or 2, b is an integer equal to 1 or 2 and the sum a+b=1, 2 or 3; and a2) units of the following formula (VI.2):

$$R^8_a SiO_{(4-a)/2} \quad (VI.2)$$

in which formula:
the symbols $R^8$, which may be identical or different, each represent a linear or branched $C_1$ to $C_{18}$ alkyl group, a $C_6$ to $C_{12}$ aryl or aralkyl group, optionally substituted, optionally by halogen atoms, and a is an integer equal to 0, 1, 2 or 3.

5. The process for combating appearance of mist during coating of one or more flexible supports as claimed in claim 1, in which the organic compound H comprising at least two (meth)acrylate functions is chosen from the group consisting of alkanediol diacrylates and alkanediol dimethacrylates, including 1,3-butylene glycol diacrylate, 1,6-hexanediol diacrylate, 1,4-butanediol diacrylate and trimethylolpropane triacrylate.

6. The process for combating appearance of mist during coating of one or more flexible supports as claimed in claim 1, in which the initial molar ratio Ri=nAcr/nH is between 4.5 and 7, optionally between 5 and 7 and optionally between 5.3 and 6.8.

7. The process for combating appearance of mist during coating of one or more flexible supports as claimed in claim 1, in which said liquid silicone composition X which is a precursor of silicone coating(s) comprises:
at least one organopolysiloxane A1 which is crosslinkable by the radical route,
at least one radical photoinitiator C1, and
optionally at least one adhesion modulator system K.

8. A process for preparing an anti-misting additive E by reacting, optionally for 30 minutes to 12 hours, at a temperature of between 10° C. and 100° C.:
per 100 parts by weight of at least one organopolysiloxane F comprising from 10 to 80 mmol of (meth)acrylate functions per 100 g of organopolysiloxane F,
from 0.01 to 1 part by weight of at least one compound chosen from the group consisting of:
an organopolysiloxane G comprising from 85 to 400 mmol of (meth)acrylate, and optionally acrylate, functions per 100 g of organopolysiloxane G,
an organic compound H comprising from 300 to 1000 mmol of (meth)acrylate, and optionally acrylate, functions per 100 g of organic compound H, and
mixtures thereof, and
from 5 to 40 parts by weight of at least one organopolysiloxane N comprising from 10 to 80 mmol of amine functions per 100 g of organopolysiloxane N,
the amounts of said compounds F, G, H and N employed being such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N.

9. An anti-misting additive E obtained by reacting, optionally for 30 minutes to 12 hours, at a temperature of between 10° C. and 100° C.:
per 100 parts by weight of at least one organopolysiloxane F comprising from 10 to 80 mmol of (meth)acrylate functions per 100 g of organopolysiloxane F,
from 0.01 to 1 part by weight of at least one compound chosen from the group consisting of:
an organopolysiloxane G comprising from 85 to 400 mmol of (meth)acrylate, and optionally acrylate, functions per 100 g of organopolysiloxane G,
an organic compound H comprising from 300 to 1000 mmol of (meth)acrylate, and optionally acrylate, functions per 100 g of organic compound H, and
mixtures thereof, and
from 5 to 40 parts by weight of at least one organopolysiloxane N comprising from 10 to 80 mmol of amine functions per 100 g of organopolysiloxane N,
the amounts of said compounds F, G, H and N employed being such that the initial molar ratio Ri=nAcr/nH is between 3.8 and 7, where nAcr is the total number of moles of (meth)acrylate functions of compounds F, G and H and nH is the number of moles of hydrogen atoms bonded to a nitrogen atom of the organopolysiloxane N.

10. A liquid silicone composition X which is crosslinkable by polyaddition, by dehydrogenative condensation, by polycondensation, by a cationic route or by a radical route, comprising the anti-misting additive E obtained as claimed in claim 9.

11. A product comprising the anti-misting additive E as defined in accordance with claim 9 for reducing the appearance of mist during coating of one or more flexible supports with a liquid silicone composition X which is a precursor of silicone coating(s).

* * * * *